United States Patent [19]
Marasco

[11] Patent Number: 5,771,996
[45] Date of Patent: Jun. 30, 1998

[54] LOCKOUT DEVICE FOR TRAILER BRAKE ACTUATOR

[75] Inventor: Albert P. Marasco, Des Moines, Iowa

[73] Assignee: DICO, Inc., Des Moines, Iowa

[21] Appl. No.: 627,894

[22] Filed: Apr. 3, 1996

[51] Int. Cl.[6] ........................... B60T 7/20
[52] U.S. Cl. ...................... 188/112 R; 188/345
[58] Field of Search .................... 188/112 R, 20, 188/345

[56] References Cited

U.S. PATENT DOCUMENTS

| | | | |
|---|---|---|---|
| 3,783,982 | 1/1974 | Wells | 188/112 R |
| 3,881,577 | 5/1975 | Wherry et al. | 188/112 R |
| 4,239,252 | 12/1980 | Huetsch et al. | 188/112 R |
| 5,013,159 | 5/1991 | Goettker | 188/112 R |
| 5,484,900 | 1/1996 | Denny | 188/112 R |
| 5,492,204 | 2/1996 | Wallace | 188/112 R |

*Primary Examiner*—Matthew C. Graham
*Attorney, Agent, or Firm*—Kent A. Herink; Brian J. Laurenzo; Michael C. Gilchrist

[57] ABSTRACT

A lockout device for selectively locking out the trailer brake actuator on a hitching device to allow for backing. The lockout device works on a hitching device having an inner housing connected to a pulling vehicle and an outer housing connected to a trailer. A brake actuator to activate the trailer brakes is connected between the inner housing and the outer housing. During towing, the actuator will activate the trailer brakes if the trailer approaches the pulling vehicle, as for example when the pulling vehicle slows and the trailer's inertia carries it towards the pulling vehicle. When the lockout device is in a lockout orientation, the lockout device prevents the inner housing from sliding rearward in the outer housing, thereby preventing the actuator from activating the trailer brakes. Upon an initial movement forward by the pulling vehicle, the lockout device will return to a neutral position so that the actuator is functional.

18 Claims, 7 Drawing Sheets

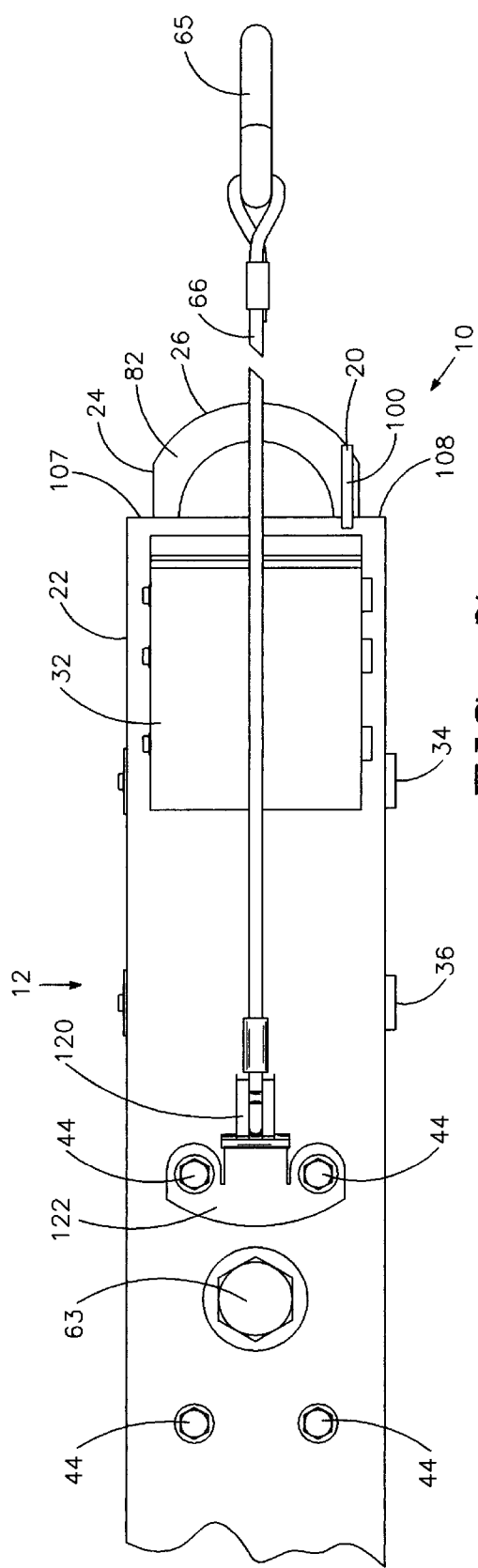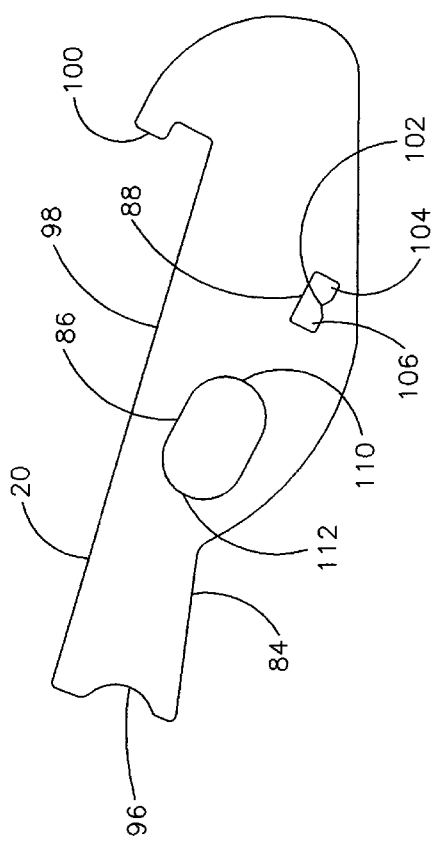

LOCKOUT DEVICE FOR TRAILER BRAKE ACTUATOR

BACKGROUND OF INVENTION

The invention relates generally to hitching devices for connecting a pulling vehicle with a trailer, and more particularly to a device for selectively locking out a trailer brake actuator integrated with a hitching device to allow for backing.

Trailer brake actuators integrated with hitching devices are well known in the prior art. These brake actuators serve the function of activating the brakes of the trailer as the trailer approaches the pulling vehicle. For example, when the pulling vehicle applies its brakes in the course of towing, thereby slowing itself, the inertia of the trailer tends to cause the trailer to approach the pulling vehicle. When this happens, the trailer brake actuator will activate the brakes of the trailer so that the trailer will not overrun the pulling vehicle and so that the pulling vehicle brakes are not required to stop both vehicles.

A typical design for a hitching device is to have an outer housing connected to the trailer, and an inner housing telescopically received within the outer housing connected to the pulling vehicle. The brake actuator is connected between the two housings, and is activated as the housings slide relative to each other. When the outer housing slides forward over the inner housing, the actuator activates the trailer brakes; when the inner housing slides forward out of the outer housing, the actuator releases the trailer brakes. Therefore, as the trailer approaches the pulling vehicle, the outer housing will move forward over the outer housing and cause the actuator to activate the trailer brakes. When the pulling vehicle begins moving forward again, the inner housing will slide forward within the outer housing, causing the actuator to release the trailer brakes.

This design has been successful in preventing "surge" of the trailer relative to the pulling vehicle during braking of the pulling vehicle. For this reason the actuators are commonly referred to as "surge actuators." However, when the pulling vehicle is backed with the trailer attached, the inner housing is forced rearward within the outer housing, thereby causing the actuator to activate the trailer brakes. In this situation, activation of the trailer brakes is undesirable as it hinders the backing. Therefore, some means of selectively locking out the brake actuator to allow for backing is desirable.

Preferably the lockout device is simple to use and inexpensive to construct. It should be readily apparent upon a visual inspection whether or not the lockout device is in the lockout mode or not. The device should be resistant to fouling, and should be protected from damage that can occur if the hitching device contacts the ground. Preferably the lockout device will move automatically from a lockout orientation to a nonlockout orientation as soon as the pulling vehicle moves forward.

Designs have been suggested for selectively locking out the brake actuator to allow for backing; however, none of the prior art devices embody all of the desired features. For example, a brake lockout device is disclosed in U.S. Pat. No. 5,485,900. However, the device in the '900 patent is susceptible to fouling if the hitching device contacts the ground. The difficulties encountered in the prior art and discussed above are substantially eliminated by the present invention.

SUMMARY OF THE INVENTION

Accordingly, it is an object of the present invention to provide a brake lockout device that is simple to use.

It is an object of the present invention to provide a brake lockout device that is inexpensive to construct and assemble.

It is a further object of the present invention to provide a brake lockout device that is resistant to fouling.

It is another object of the present invention to provide a brake lockout device that is durable.

It is yet another object of the present invention to provide a brake lockout device that will move automatically from a lockout orientation to a neutral orientation as the pulling vehicle is moved away from the trailer.

It is a further objective of the present invention to provide a brake lockout device for which it readily can be determined whether or not it is in the lockout orientation by a visual inspection.

These and other objects will become apparent upon reference to the following specification, drawings, and claims.

By the present invention, it is proposed to meet these objectives and other more specific objectives which will become apparent as the description proceeds. To this end, a brake lockout device for selectively preventing activation of trailer brakes when a pulling vehicle is backed toward a trailer is proposed. The lockout device is for use on a hitching device having a trailer brake actuator connected between an outer housing and a telescopically received inner housing. The outer housing is operably connected to the trailer, and the inner housing is operably connected to a pulling vehicle. The inner housing slides within the outer housing to activate the brakes of the trailing vehicle as the trailer approaches the pulling vehicle. In the brake lockout device, a pivot pin is attached to the inner housing. A lever having a pivot slot is provided. The pivot slot is in engagement with the pivot pin such that the lever can slide relative to the pivot pin along the slot between a forward position and a rearward position, and such that the lever can pivot about the pivot pin between a lockout orientation and a neutral orientation. When in the lockout orientation, the lever prevents the actuator from activating the trailer brakes as the pulling vehicle moves toward the trailing vehicle. When in the neutral orientation, the brake actuator is unaffected by the lever. A ledge is provided on the outer housing, and a catch on the lever maintains the lever in the lockout orientation when the catch is in engagement with the ledge. Means are provided to urge the lever into the neutral orientation as the pulling vehicle moves away from the trailer.

Preferably, the urging means is a torsion spring received in a punchout in the lever. The punchout has a hump to hold the lever in a forward or a rearward position. The hump further serves to move the catch out of engagement with ledge upon an initial movement forward by the pulling vehicle.

BRIEF DESCRIPTION OF THE DRAWINGS

FIG. 7 is a plan view of the hitching device of FIG. 1; and

FIG. 8 is a detail elevation view of the lever according to the present invention.

DETAILED DESCRIPTION OF PREFERRED EMBODIMENTS

Figure 1:
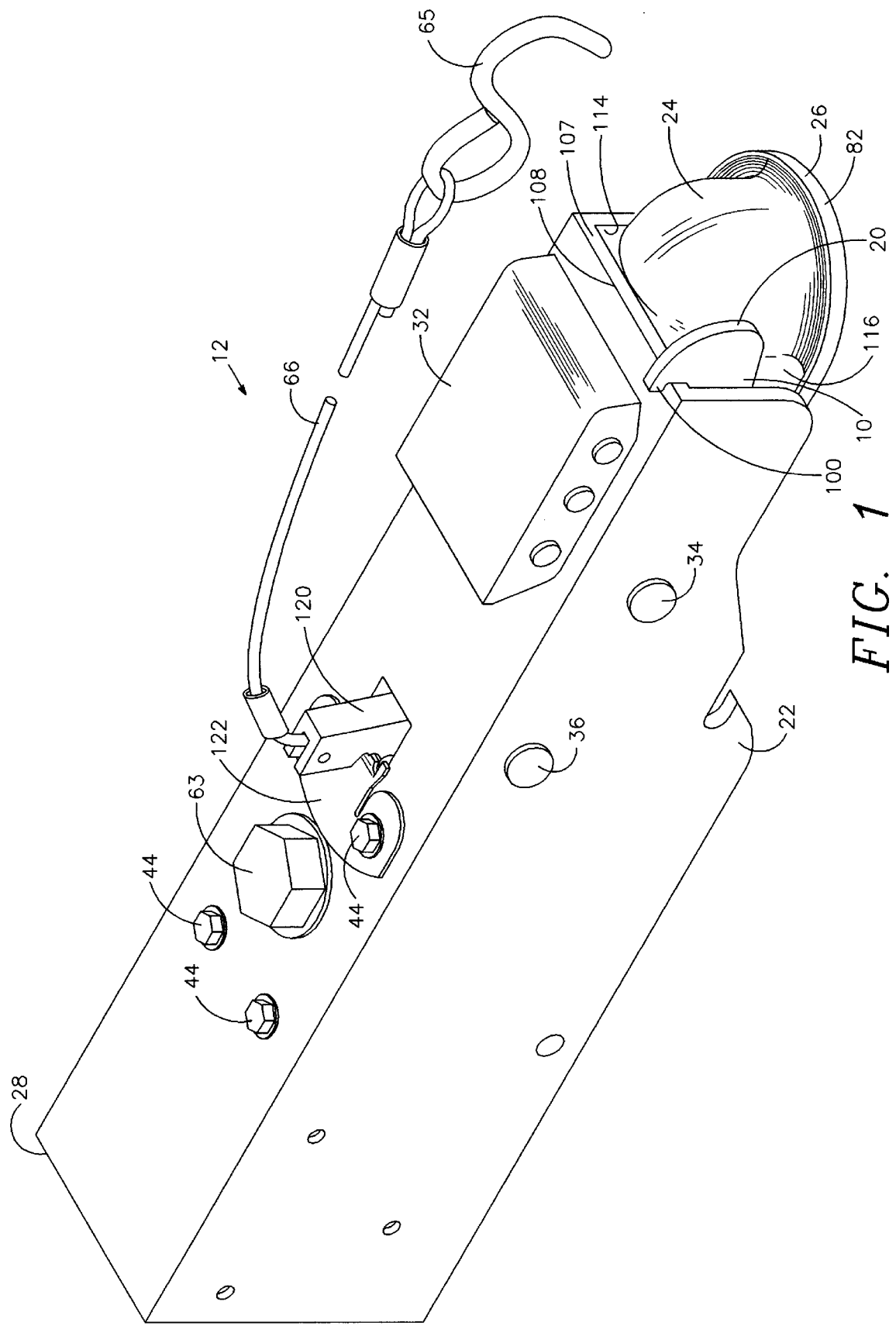
FIG. 1 is a perspective view of a hitching device having a brake lockout device in accordance with the present invention, with a lever from the lockout device in a rearward position and a lockout orientation.

Shown generally in the drawings is a brake lockout device 10 for use with a hitching device 12. The hitching device 12 is used to connect a trailer 14 with a pulling vehicle 16. The hitching device 12 has a brake actuator 18 which activates trailer brakes as the trailer 14 approaches the pulling vehicle 16. The lockout device has a lever 20 which can be moved to a lockout orientation (FIGS. 1, 3, 4, 5, 6, & 7) in order to prevent the actuator 18 from activating the trailer brakes during backing. When the pulling vehicle 16 moves away from the trailer 14, the lever 20 will automatically move back to a neutral orientation (FIG. 2) so that the actuator 18 will be able to activate the trailer brakes as the trailer 14 surges relative to the pulling vehicle 18.

Figure 2:
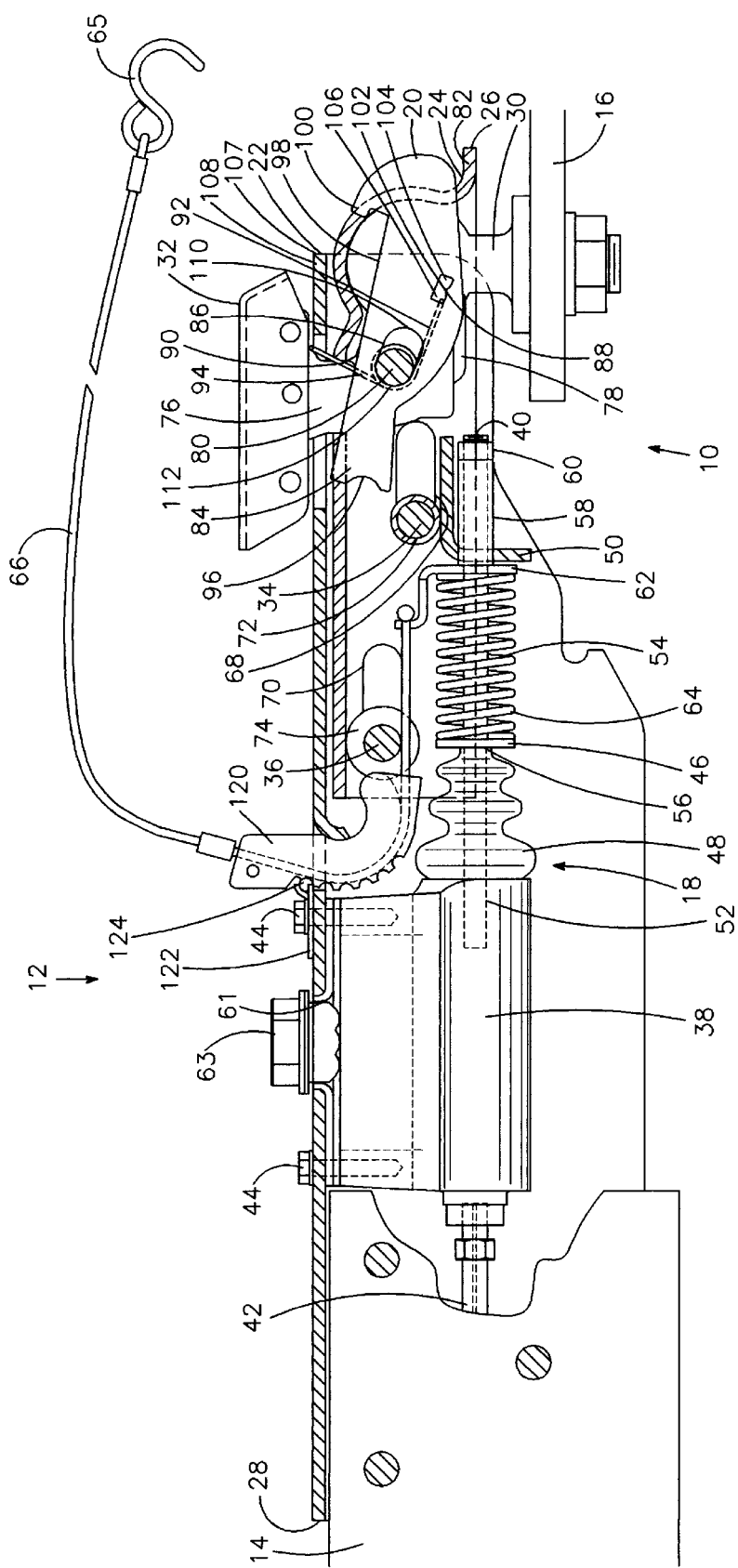
FIG. 2 is a cut-away elevation view of the hitching device of FIG. 1 in an extended position with the lever moved to a forward position and a neutral orientation.
Figure 3:
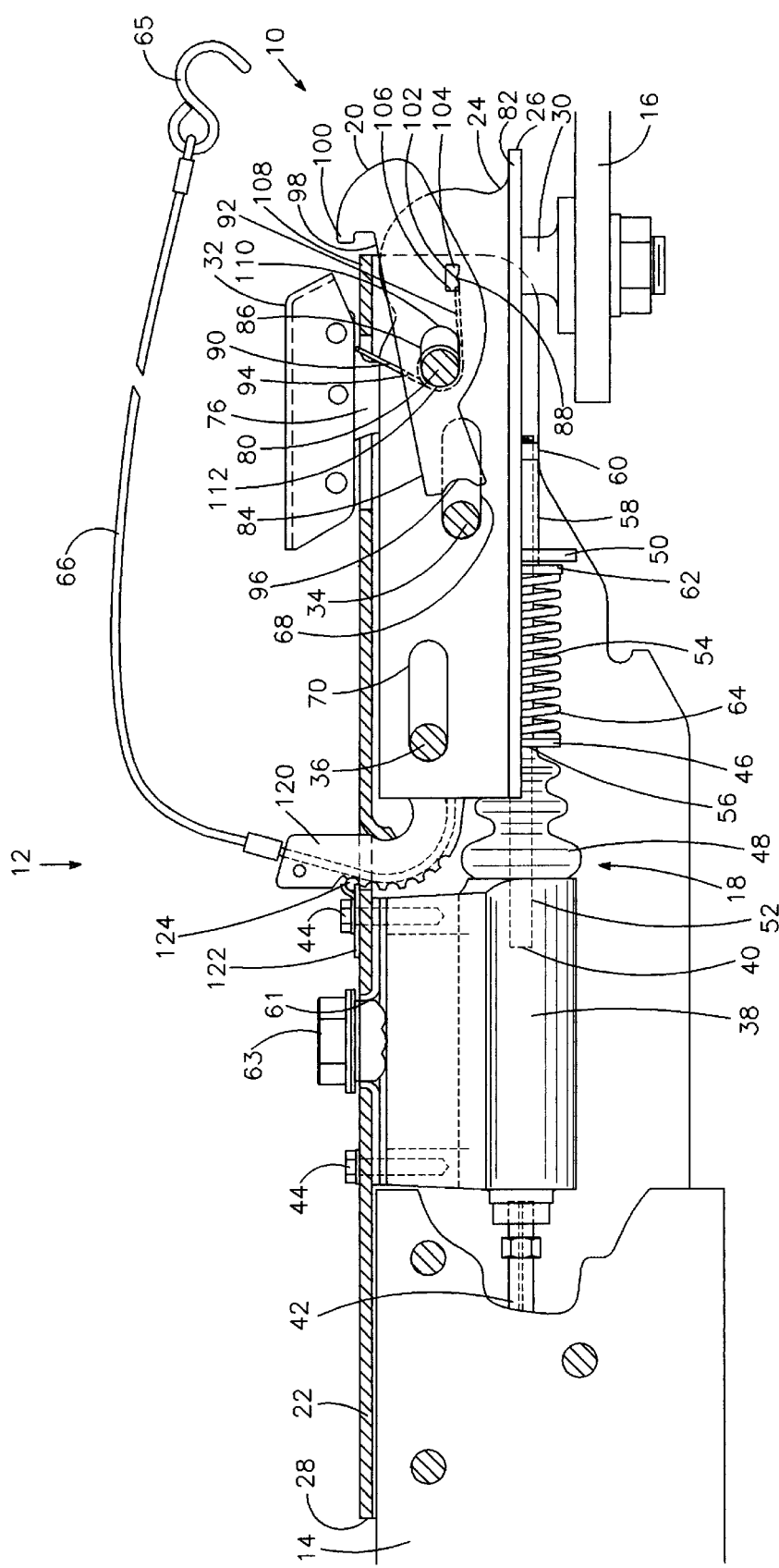
FIG. 3 is a partial side elevation view of the hitching device of FIG. 1 in the extended position with the lever moved to a forward position and the lockout orientation.
Figure 4:
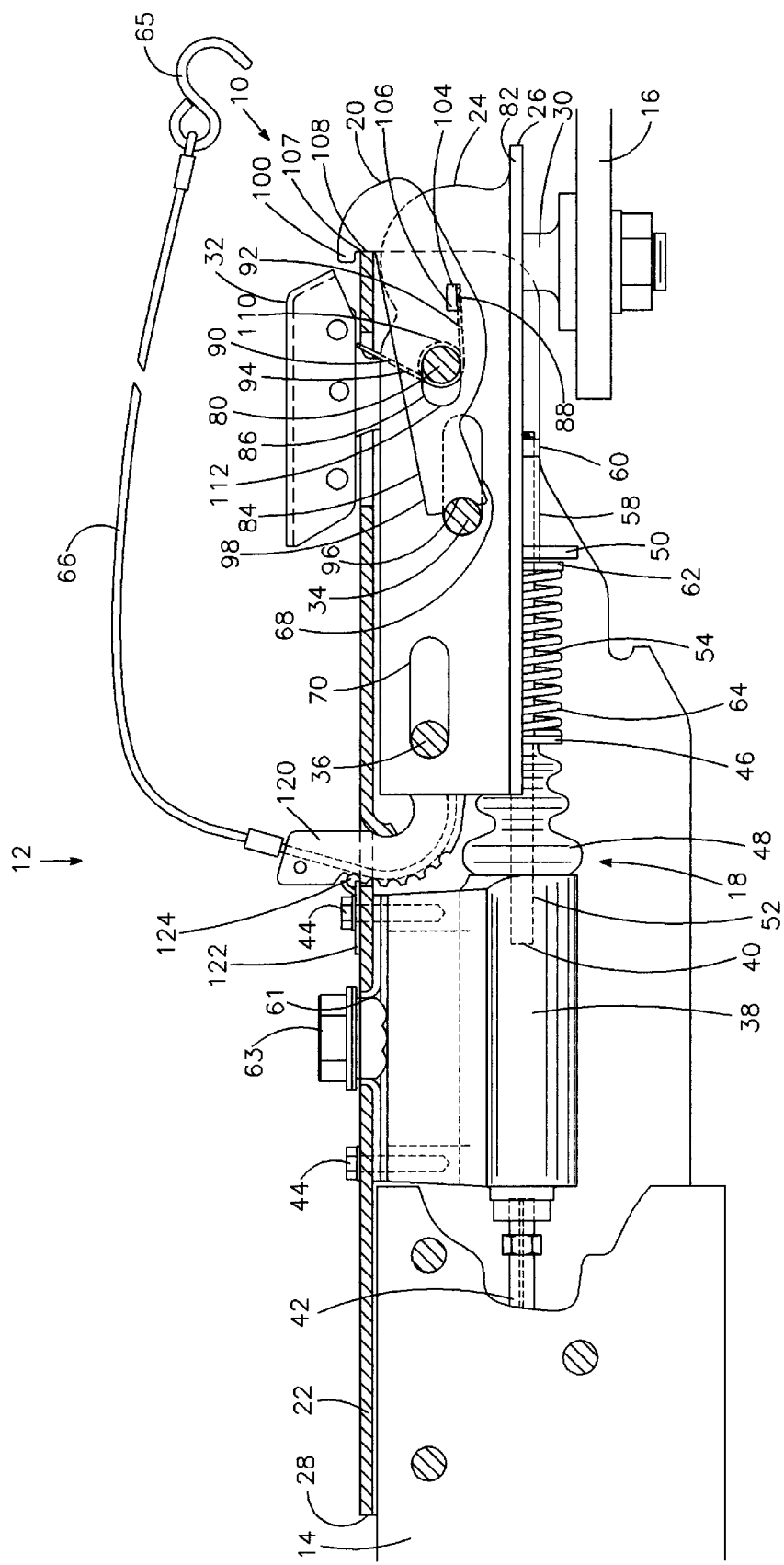
FIG. 4 is a partial side elevation view of the hitching device of FIG. 1 in the extended position.
Figure 5:
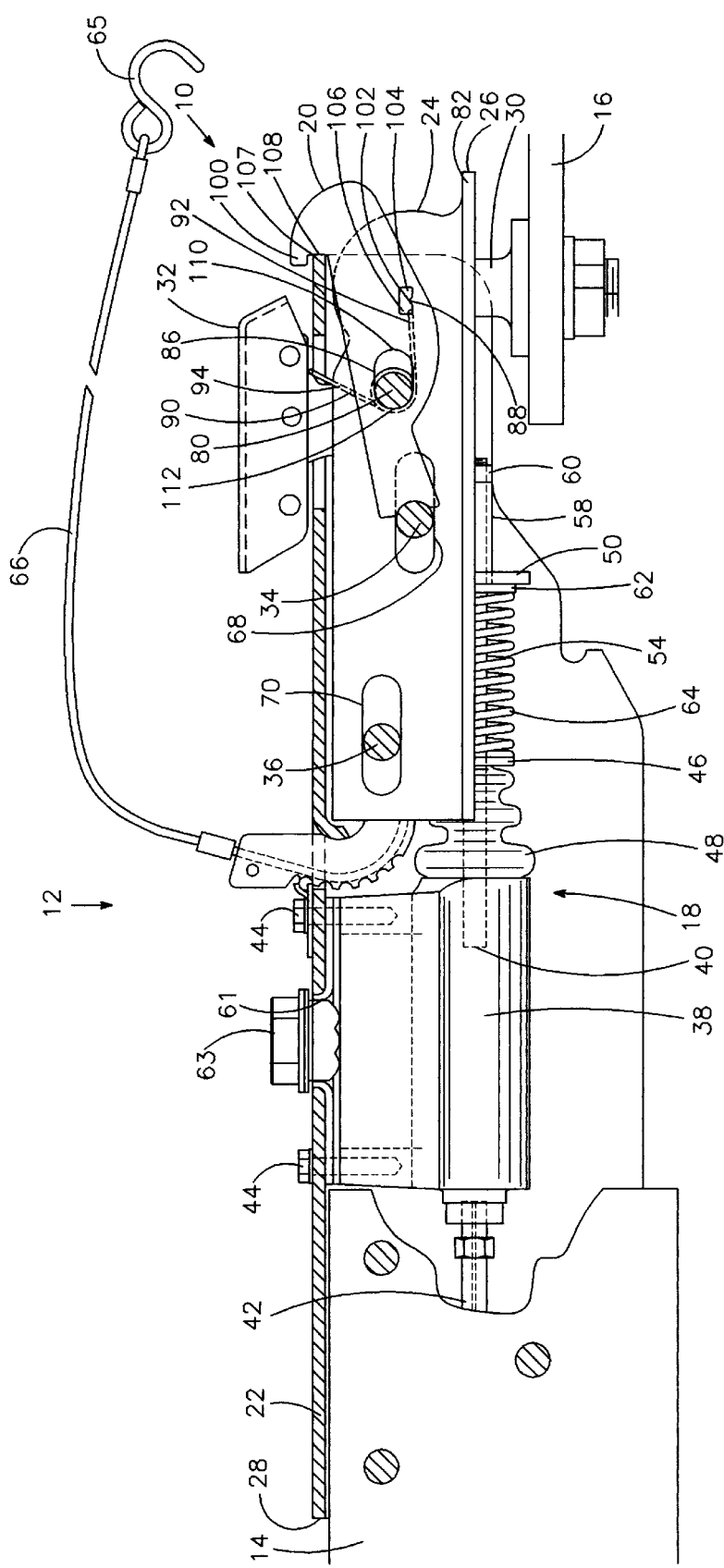
FIG. 5 is a partial side elevation view of the hitching device of FIG. 1 in a compressed position with the lever in a forward position after the pulling vehicle has been backed with the lever in a lockout orientation.

The hitching device 12 is shown with the lever 20 in the lockout orientation. The hitching device 12 has an outer housing 22 that is for operable connection with the trailer 14, and an inner housing 24 that is for operable connection with the pulling vehicle 16. The inner housing 24 is at a front end 26 of the hitching device 12 and the outer housing 22 is at a rear end 28 of the hitching device 12. The inner housing 24 fits telescopically within the outer housing 22. When the pulling vehicle 16 is pulling the trailer 14, the inner housing 24 is moved forward relative to the outer housing 22 so that the hitching device 12 is in an extended position (FIGS. 2, 3, & 4). As the pulling vehicle 16 backs toward the trailer 14 the inner housing 24 is moved rearward into the outer housing 22 so that the hitching device 12 is in a compressed position (FIG. 5). In the preferred embodiment the inner housing 24 is adapted fit over a hitch ball 30 (FIG. 2); however, the lockout device 10 would work equally well with other types of inner housings. A handle 32 is provided to lock and unlock the inner housing 24 in place on the hitch ball 30. A front 34 and a rear 36 connection bolt are provided to retain the inner housing 24 within the outer housing 22. The embodiment of FIG. 1 includes a break-away cable 66 and break-away hook 65. In operation, the break-away hook 65 is connected to the pulling vehicle 16 to activate the brake actuator 18 in case the trailer 14 comes unhitched from the pulling vehicle 16.

As best seen in FIG. 2, the brake actuator 18 comprises a master cylinder 38, a plunger rod 40, and a brake line 42. The master cylinder 38 is attached to the outer housing 22 by master cylinder bolts 44. A filler cap 63 is provided to cover an aperture 61 in the outer housing 22 to allow filling of the master cylinder 38 with hydraulic fluid. The brake line 42 extends from the rear of the master cylinder 38 and leads to the trailer brakes (not shown). The plunger rod 40 is received through the front of the master cylinder 38 and pressurizes hydraulic fluid within the master cylinder 38 as the plunger rod 40 is stroked into the master cylinder 38, thereby forcing hydraulic fluid into the brake line 42 and activating the trailer brakes. A push plate 50 is welded to the inside of the inner housing 24. The push plate 50 is operably connected to the plunger rod 40, so that as the inner housing slides 24 rearward with respect to the outer housing 22, the plunger rod 40 is stroked into the master cylinder 38 by the push plate 50 to activate the trailer brakes.

The plunger rod 40 is a stepped shaft, with a wider portion 52 being received into the master cylinder 38. A back plate 46 rests against a shoulder 56 on the plunger rod 40 at the interface between the wider portion 52 and a narrower portion 54 of the plunger rod 40. Between the master cylinder 38 and the back plate 46, a flexible boot 48 covers the plunger rod 40. At the front end of the plunger rod 40, a sleeve 58 is fastened to the plunger rod 40 with a nut 60. The sleeve 58 is received through the push plate 50. A break-away plate 62 is provided about the plunger rod 40. The break-away plate 62 is held in place against the sleeve 58 by an overload spring 64. The push plate 50 aligns with the break-away plate 62. The break-away plate 62 is connected to the break-away cable 66 which attaches to the rear of the pulling vehicle 16. The overload spring 64 is pre-stressed to approximately 300 pounds of compression between the back plate 46 and the break-away plate 62.

If the hitching device 12 should come off the pulling vehicle 16 during towing, the trailer 14 could break-away from the pulling vehicle 16. During a break-away, the break-away cable 66 would be pulled tight by the hook 65 attached to the pulling vehicle 16, until the hook 16 straightened and came free from the pulling vehicle 16. The cable 66 would pull the break-away plate 62 toward the master cylinder 38, thereby stroking the plunger rod 40 into the master cylinder 38 and activating the trailer brakes. Preferably, a ratcheting break-away lever 120 is provided to hold the cable 66 tight with the trailer brakes activated after the cable 66 releases from the pulling vehicle 16. The ratcheting break-away lever 120 is allowed to move upwards, but a leaf spring 122 holds a catch pin 124 against the teeth of the ratcheting break-away lever 120 to prevent the ratcheting break-away lever 120 from moving down and releasing the trailer brakes. A detailed description of the break-away mechanism can be founding in pending application Ser. No. 08/535,720. It is contemplated that other break-away mechanisms would work perfectly well with the brake lockout device 10. The overload spring 64 protects the master cylinder 38 from excessive pressures that can arise when the trailer breaks away from the pulling vehicle 16.

In a standard towing situation when the pulling vehicle 16 applies its brakes, the inertia of the trailer 14 will tend to slide the outer housing 22 over the inner housing 24. When this happens, the push plate 50 will press against the break-away plate 62 which in turn will push the overload spring 64 into the back plate 46 which will move the plunger rod 40 into the master cylinder 38, thereby activating the trailer brakes. When the pulling vehicle 16 begins to pull the trailer 14 again, the inner housing 24 will be pulled forward, out of the outer housing 22, moving the push plate 50 away from the master cylinder 38. The hydraulic pressure within the master cylinder 38 will move the plunger rod 40 out of the master cylinder 38, thereby deactivating the trailer brakes.

The front connection bolt 34 is received in front slots 68 in the inner housing 24, and the rear connection bolt 36 is received through rear slots 70 in the inner housing 24. These slots 68, 70 allow for the sliding of the inner housing 24 relative to the outer housing 22, but restrict the range of motion to the length of the slots 68, 70. In the preferred embodiment a front roller 72 and rear rollers 74 are provided on the front and rear connection bolts 34, 36 respectively. The rear rollers 74 support the under surface of the inner housing 24. The front roller 72 rests on a top surface of the push plate 50 which is welded to the inner housing 24. The rollers 72, 74 reduce the friction between the inner housing 24 and the outer housing 22, and reduce wear on the contact surfaces.

A stirrup 76 (FIG. 2) is attached to the inner housing 24. The handle 32 is mounted on the stirrup 76, as is a clamp 78 which holds the hitch ball 30 in place in the inner housing 24 when the handle 32 is in a locked position. The clamp 78 pivots about a pivot pin 80. A lockout lever 20 located between the inner housing 24 and the outer housing 22 also pivots about the pivot pin 80 between a neutral orientation and a lockout orientation. When the lockout lever 20 is in the neutral orientation (FIG. 2), the lever 20 rests against a lip 82 that extends radially from the bottom of the inner housing 24, and the lockout lever 20 will not interfere with the movement of the inner housing 24 relative to the outer housing 22. When the lockout lever 20 is in the lockout orientation (FIGS. 1, 3, 4, 5, 6, 7), a tail section 84 of the lever 20 is aligned with the front connection bolt 34, so that the lever 20 will be wedged between the pivot pin 80 and the front connection bolt 34 as the inner housing 24 moves rearward relative to the outer housing 22, thereby restricting the rearward movement of the inner housing 24 relative to the outer housing 22.

The lever 20 is received on the pivot pin 80 about a slot 86 in the lever 20 which allows for the pivot between the neutral and the lockout orientations, and also allows for the lever 20 to slide relative to the pivot pin 80 between a forward (FIGS. 2, 3, 5, & 6) and a rearward (FIGS. 1, 4, & 7) position. The lever 20 is located on the pivot pin 80 between an inner surface 114 of the outer housing 22 and an outer surface 116 of the inner housing 24. The lever 20 has a kidney-shaped punchout 88 removed forward from the slot 86 (FIG. 8). This punchout 88 receives a first leg 92 of a torsion spring 90 which is coiled around the pivot pin 80. The torsion spring 90 has second leg 94 which presses against the stirrup 76. The torsion spring 90 tends to urge the front end of the lever 20 away from the stirrup 76 into the neutral orientation.

The tail section 84 of the lever 20 has a curved surface 96 for engagement with the front connection bolt 34. The front connection bolt 34 acts as a lockout rod to prevent the inner housing 24 from sliding rearward into the outer housing 22 when the lever 20 is in the lockout orientation. A hook-shaped catch 100 extends from a top surface 98 of the lever 20 at the front of the lever 20. The catch 100 serves as a visual indicator of whether or not the lever 20 is in the lockout orientation, as well as providing additional means to prevent the inner housing 24 from sliding rearward. The punchout 88 has a hump 102 on its bottom edge that divides the punchout 88 into a front section 104 and a rear section 106 (FIG. 8). When the lever 20 is in the forward position, the first leg 92 of the torsion spring 90 is in the rear section 106 of the punchout 88 (FIGS. 2, 3, 5, & 6). When the lever 20 is in the rearward position, the first leg 92 of the torsion spring 90 is in the front section 104 of the punchout 88 (FIG. 4). The hump 102 has sloped sides which bias the first leg 92 of the spring 90 into either the front section 104 of the punchout 88 or the rear section 106 of the punchout 88, and prevents the first leg 92 of the spring 90 from remaining in between. The hump 102 therefore tends to retain lever 20 into either the forward position or the rearward position, and tends to prevent the lever 20 from remaining in an intermediate position.

To use the lockout device 10 to lockout the brake actuator 18 to allow backing, the lever 20 is pulled to the forward position (FIG. 2), rotated to the lockout orientation (FIG. 3), and then moved to the rearward position while in the lockout orientation (FIG. 4). The lever 20 is slid to the rearward position so that the catch 100 will engage a ledge 107 formed by the front edge 108 of the outer housing 22 to hold the lever 20 in the lockout orientation. It is necessary to have the lever 20 in the forward position before rotating to the lockout orientation so that the catch 100 will clear the front edge 108 of the outer housing 22. When the lever 20 has been rotated to the lockout orientation and slid back to the rearward position, the curved surface 96 on the tail section 84 of the lever 20 will be in contact with the front connection bolt 34 (FIG. 4). As the pulling vehicle 16 is backed toward the trailer 14, the pivot pin 80 moves toward the front connection bolt 34; however, the lever 20 will remain stationary as it will be prevented from moving rearward by the curved surface 96 in contact with the front connection bolt 34. As the pivot pin 80 moves rearward relative to the front connection bolt 34, with the lever 20 held stationary, the first leg 92 of the torsion spring 90 is moved across the hump 102 in the punchout 88 to the rear section 106 of the punchout 88, so that the lever 20 is in the forward position (FIG. 5). As the first leg 92 of the torsion spring 90 moves across the hump 102, the pivot pin 80 moves from a front end 110 of the slot 86 in the lever 20 to a rear end 112 of the slot 86. Once the pivot pin 80 reaches the rear end 112 of the slot 86, the lever 20 will be wedged between the pivot pin 80 and the front connection bolt 34, and the inner housing 24 will not be able to slide rearward with respect to the outer housing 22 (FIG. 5). The push plate 50 will not move the plunger rod 40 to activate the trailer brakes. The pulling vehicle 16 will be able to back the trailer 14 without the trailer brakes being applied.

Figure 6:
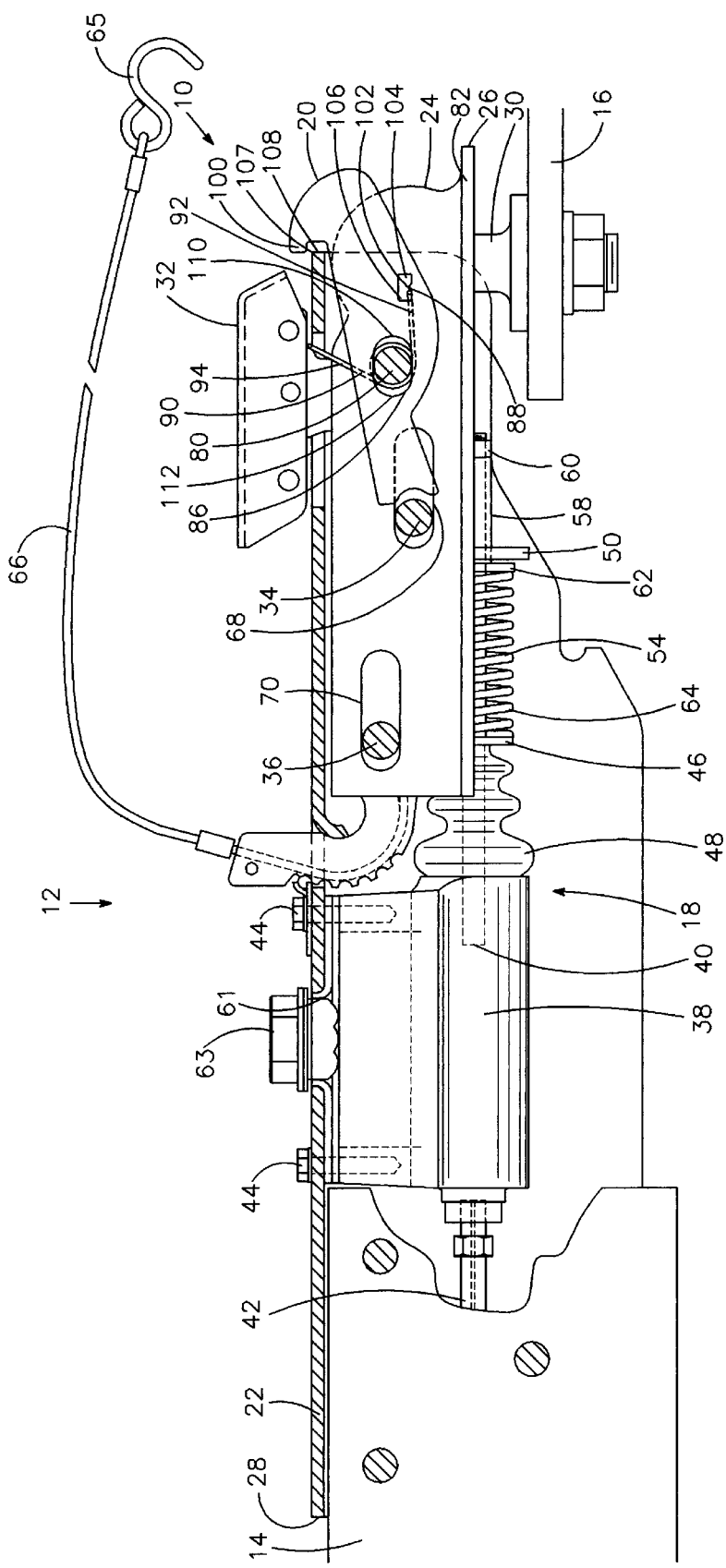
FIG. 6 is a partial side elevation view of the hitching device of FIG. 1 in transition between the compressed position and the extended position with the lever in a forward position and a lockout orientation as the pulling vehicle is moved away from the trailer after backing.

After the pulling vehicle 16 has backed the trailer 14, the lever 20 will be in the forward position, with the first leg 92 of the torsion spring 90 in the rear section 106 of the punchout 88 (FIG. 5). As best seen in FIG. 6, when the pulling vehicle 16 pulls forward, the inner housing 24 will be pulled forward, thereby pulling the pivot pin 80 forward. The torsion spring 90 coiled around the pivot pin 80 will also be pushed forward. The first leg 92 of the torsion spring 90 will press against the hump 102 in the punchout 88 which will move the lever 20 forward until the catch 100 is moved off the front edge 108 of the outer housing 22 (FIG. 5). Once the catch 100 is clear from the front edge 108 of the outer housing 22, the torsion spring 90 will snap the lever 20 back to the neutral orientation. The hump 102 in the punchout 88 allows the lever 20 to be moved to the neutral orientation almost immediately upon pulling forward, without the need for the inner housing 24 to move the length of the slot 86 in the lever 20 before pressing the lever 20 forward to move the catch 100 off the front edge 108 of the outer housing 22.

The foregoing description and drawings merely explain and illustrate preferred embodiments of the invention and the invention is not limited thereto, except insofar as the claims are so limited. Those skilled in the art, who have the disclosure before them, will be able to make modifications and variations therein without departing from the scope of the invention. For example, while the device is shown with the punchout 88 located forward from the pivot pin 80, it would be an obvious modification to locate the punchout 88 rearward from the pivot pin 80 and use a torsion spring that would bias the tail section 84 of the lever 20 upward. In that case the hump 102 in the punchout 88 would be located at a top edge of the punchout 88 rather than the bottom edge.

What is claimed is:

1. In a hitching device for hitching a trailer to a pulling vehicle, wherein the hitching device has an outer housing operably connected to the trailer and an inner housing operably connected to the pulling vehicle, wherein the inner housing slides within the outer housing, wherein the hitching device has a brake actuator connected between the inner housing and the outer housing such that brakes to the trailer are activated as the trailer approaches the pulling vehicle and the housings slide relative to each other, a brake lockout device for selectively preventing activation of the trailer brakes when the pulling vehicle is being backed, the brake lockout device comprising:

a pivot pin attached to the inner housing;

a lever having a pivot slot which is engaged by said pivot pin such that said lever can slide relative to said pivot pin along said slot between a forward position and a rearward position, and can pivot about said pivot pin between a neutral orientation wherein the brake actuator is unaffected by said lever and a lockout orientation wherein said lever prevents the actuator from being activated as the pulling vehicle moves toward the trailer, said lever having a punchout;

a ledge on said outer housing;

a catch on said lever for maintaining said lever in said lockout orientation when said catch is engaged with said ledge;

a hump on said punchout in said lever for retaining said lever in said forward position and said rearward position; and means for urging said lever into said neutral orientation as the pulling vehicle moves away from the trailer with the hitching device in operable connection between the trailer and the pulling vehicle, said urging means being in operable engagement between the inner housing and said punchout in said lever.

2. The brake lockout device of claim 1, further comprising a lockout rod attached to the outer housing, said lockout rod located such that as said pulling vehicle moves toward said trailer with said lever in said lockout orientation a portion of said lever wedges between said pivot pin and said lockout pin, thereby preventing the inner housing from sliding toward the trailer relative to the outer housing.

3. The brake lockout device of claim 1, wherein said lever will move automatically from said lockout orientation to said neutral orientation upon movement of the pulling vehicle away from the trailer.

4. The brake lockout device of claim 1, wherein said lever is positioned between an inner surface of said outer housing and an outer surface of said inner housing.

5. The brake lockout device of claim 1, wherein when said lever is in said forward position said hump retains said urging means in a rearward section of said punchout and when said lever is in said rearward position said hump retains said urging means in a forward section of said punchout.

6. The brake lockout device of claim 5, wherein as pulling vehicle is moved sufficiently toward said trailer with said lever in said lockout orientation, said urging means is moved to said rearward section of said punchout so that said lever is in said forward position.

7. The brake lockout device of claim 6, wherein as said pulling vehicle moves away from said trailer with said lever in said forward position and said lockout orientation, said urging means engages said hump to move said catch off said ledge so that said urging means can move said lever to said neutral orientation.

8. The brake lockout device of claim 1, wherein said urging means is a torsion spring coiled around said pivot pin having a first leg received by said punchout and a second leg in operable engagement with said inner housing.

9. The brake lockout device of claim 1, wherein said forward position allows said catch to move past said ledge as said lever is moved to said lockout orientation.

10. In a hitching device for hitching a trailer to a pulling vehicle, wherein the hitching device has an outer housing operably connected to the trailer and an inner housing operably connected to the pulling vehicle, wherein the inner housing slides within the outer housing, wherein the hitching device has a brake actuator connected between the inner housing and the outer housing such that brakes to the trailer are activated as the trailer approaches the pulling vehicle and the housings slide relative to each other, a brake lockout device for selectively preventing activation of the trailer brakes when the pulling vehicle is being backed, the brake lockout device comprising:

a pivot pin attached to the inner housing;

a ledge on said outer housing;

a lever having a pivot slot which is engaged by said pivot pin such that said lever can slide relative to said pivot pin along said slot between a forward position and a rearward position, and can pivot about said pivot pin between a neutral orientation wherein the brake actuator is unaffected by said lever and a lockout orientation wherein said lever prevents the actuator from being activated as the pulling vehicle moves toward the trailer;

a catch on said lever for maintaining said lever in said lockout orientation when said catch is engaged with said ledge, said forward position of said lever allowing said catch to move past said ledge as said lever is moved to said lockout orientation;

means for retaining said lever in said forward position and said rearward position; and means for urging said lever into said neutral orientation as the pulling vehicle moves away from the trailer with the hitching device in operable connection between the trailer and the pulling vehicle.

11. In a hitching device for hitching a trailer to a pulling vehicle, wherein the hitching device has an outer housing for operable connection to the trailer at a rearward end of the hitching device and an inner housing for operable connection to the pulling vehicle at a forward end of the hitching device, wherein the inner housing is telescopically received within the outer housing, and wherein the hitching device has a brake actuator mounted between the inner housing and the outer housing activated by the inner housing sliding rearward within the outer housing as the trailer approaches the pulling vehicle to apply brakes to the trailer, a brake lockout device for selectively preventing full activation of the actuator when the pulling vehicle is moved toward the trailer, the brake lockout device comprising:

a pivot pin attached to the inner housing;

a lever having a slot which is engaged by said pivot pin such that said lever is selectively slideable relative to said pivot pin between a forward position and a rearward position and is selectively pivotable about said pivot pin between a neutral orientation wherein the brake actuator is unaffected by said lever and a lockout orientation wherein said lever prevents the inner housing from sliding relative to the outer housing thereby locking out the brake actuator, said lever being located between an outer surface of said inner housing and an inner surface of said outer housing;

a ledge on said outer housing said ledge being located forwardly from said pivot pin;

a lockout rod attached to the outer housing rearwardly from said pivot pin, said lockout rod located such that as said pulling vehicle is moved toward said trailer with the hitching device in operable connection between the pulling vehicle and the trailer and with said lever in said lockout orientation, a portion of said lever wedges between said pivot pin and said lockout rod, thereby preventing the inner housing from sliding toward the trailer relative to the outer housing:

a catch on said lever for maintaining said lever in said lockout orientation when said catch is engaged with said ledge means on said lever for retaining said lever in said forward position and said rearward position; and means for automatically urging said lever out of said lockout orientation into said neutral orientation as the pulling vehicle moves away from the trailer.

12. The brake lockout device according to claim 11, wherein said forward position allows said catch to move past said ledge as said lever is moved to said lockout orientation.

13. The brake lockout device according to claim 11, wherein:

said lever has a punchout to retain said urging means; and said means on said lever for retaining said lever in said forward position and said rearward position comprises a hump on said punchout to retain said urging means on a forward side of said hump when said lever is in said rearward position and to retain said urging means on a rearward side of said hump when said lever is in said forward position.

14. The brake lockout device according to claim 11, wherein:

said urging means is a torsion spring;

said lever has a punchout which receives a leg of said spring; and said means on said lever for retaining said lever in said forward position and said rearward position comprises a hump on said punchout to retain said leg on a forward side of said hump when said lever is in said rearward position and to retain said leg on a rearward side of said hump when said lever is in said forward position.

15. The brake lockout device according to claim 4, wherein:

as said pulling vehicle moves toward the trailer with said lever in said rearward position and said lockout orientation, said spring leg moves across said hump to said rearward side of said hump so that said lever is moved to said forward position; and as the pulling vehicle moves away from the trailer with said lever in said forward position and said lockout orientation, said spring leg presses against said hump to move said catch forward off said ledge so that said spring can urge said lever into said neutral orientation.

16. In a hitching device for hitching a trailer to a pulling vehicle, wherein the hitching device has an outer housing for operable connection to the trailer at a rearward end of the hitching device and an inner housing for operable connection to the pulling vehicle at a forward end of the hitching device, wherein the inner housing is telescopically received within the outer housing, and wherein the hitching device has a brake actuator mounted between the inner housing and the outer housing activated by the inner housing sliding rearward within the outer housing as the trailer approaches the pulling vehicle to apply brakes to the trailer, a brake lockout device for selectively preventing full activation of the actuator when the pulling vehicle is moved toward the trailer, the brake lockout device comprising:

a pivot pin attached to the inner housing;

a ledge located forwardly from said pivot pin;

a lever having a slot which is engaged by said pivot pin such that said lever is selectively pivotable between a neutral orientation wherein the brake actuator is unaffected by the said lever and a lockout orientation wherein said lever prevents the inner housing from sliding rearward within the outer housing thereby locking out the brake actuator, and is selectively slideable between a forward position to allow said lever to be moved from said neutral orientation to said lockout orientation and a rearward position to allow said lever to be maintained in said lockout orientation, said lever being located between an outer surface of the inner housing and an inner surface of the outer housing;

a catch on said lever for maintaining said lever in said lockout orientation when said catch is engaged with said ledge;

a lockout rod attached to the outer housing rearwardly from said pivot pin, said lockout rod located such that as the pulling vehicle is moved toward the trailer with said lever in said lockout orientation a portion said lever wedges between said pivot pin and said lockout rod, thereby preventing the inner housing from sliding rearward within the outer housing;

a torsion spring coiled around said pivot pin for urging said lever out of said lockout orientation into said neutral orientation as the pulling vehicle moves away from the trailer;

a punchout in said lever which receives a leg of said torsion spring; and a hump in said punchout to retain said lever in said forward position when said first leg of said torsion spring is rearward from said hump and to retain said lever in said rearward position when said first leg of said torsion spring is forward from said hump.

17. The brake lockout device according to claim 16, wherein:

as said pulling vehicle moves toward said trailer with said lever in said rearward position and said lockout orientation, said spring leg moves across said hump to said rearward side of said hump so that said lever is moved to said forward position; and as said pulling vehicle moves away from said trailer with said lever in said forward position and said lockout orientation, said spring leg presses against said hump to move said catch forward off said ledge so that said torsion spring can urge said lever into said neutral orientation.

18. In a hitching device for hitching a trailer to a pulling vehicle, wherein the hitching device has an outer housing for operable connection to the trailer at a rearward end of the hitching device and an inner housing for operable connection to the pulling vehicle at a forward end of the hitching device, wherein the inner housing is telescopically received within the outer housing, and wherein the hitching device has a brake actuator mounted between the inner housing and the outer housing activated by the inner housing sliding rearward within the outer housing as the trailer approaches the pulling vehicle to apply brakes to the trailer, a brake lockout device for selectively preventing full activation of the actuator when the pulling vehicle is moved toward the trailer, the brake lockout device comprising:

a pivot pin attached to the inner housing;

a lever having a slot which is engaged by said pivot pin such that said lever is selectively slideable relative to said pivot pin between a forward position and a rearward position and is selectively pivotable about said pivot pin between a neutral orientation wherein the brake actuator is unaffected by said lever and a lockout orientation wherein said lever prevents the inner housing from sliding relative to the outer housing thereby locking out the brake actuator, said lever being located between an outer surface of said inner housing and an inner surface of said outer housing, said lever having a punchout;

a ledge on said outer housing;

a catch on said lever for maintaining said lever in said lockout orientation when said catch is engaged with said ledge;

means for automatically urging said lever out of said lockout orientation into said neutral orientation as the pulling vehicle moves away from the trailer; and a hump on said punchout to retain said urging means on a forward side of said hump to retain said lever in said rearward position and to retain said urging means on a rearward side of said hump to retain said lever in said forward position.

* * * * *